Oct. 25, 1949.  S. E. KEAGLE  2,485,832
FEEDER

Filed Jan. 17, 1946  3 Sheets-Sheet 1

INVENTOR.
STANLEY E. KEAGLE
BY
G. H. Braddock
ATTORNEY

Oct. 25, 1949.  S. E. KEAGLE  2,485,832
FEEDER
Filed Jan. 17, 1946  3 Sheets-Sheet 2
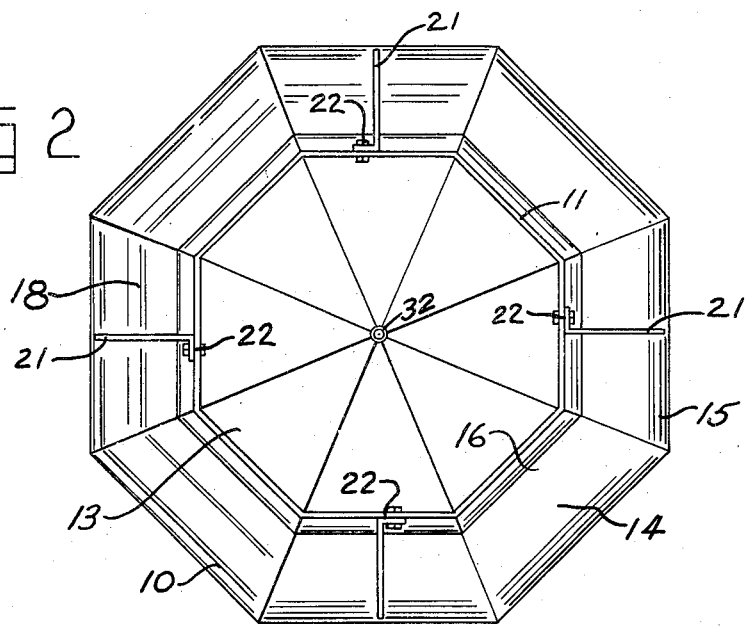
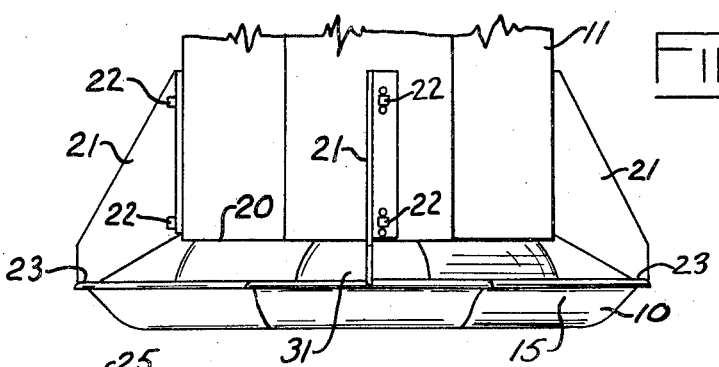
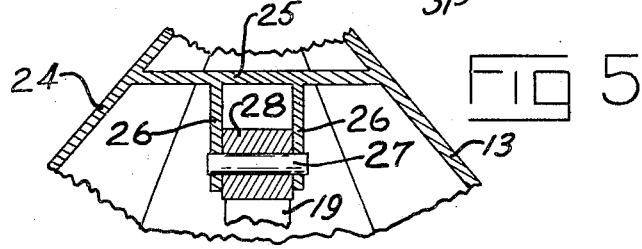
INVENTOR.
STANLEY E. KEAGLE
BY
G. H. Braddock
ATTORNEY Oct. 25, 1949.  S. E. KEAGLE  2,485,832
FEEDER
Filed Jan. 17, 1946  3 Sheets-Sheet 3
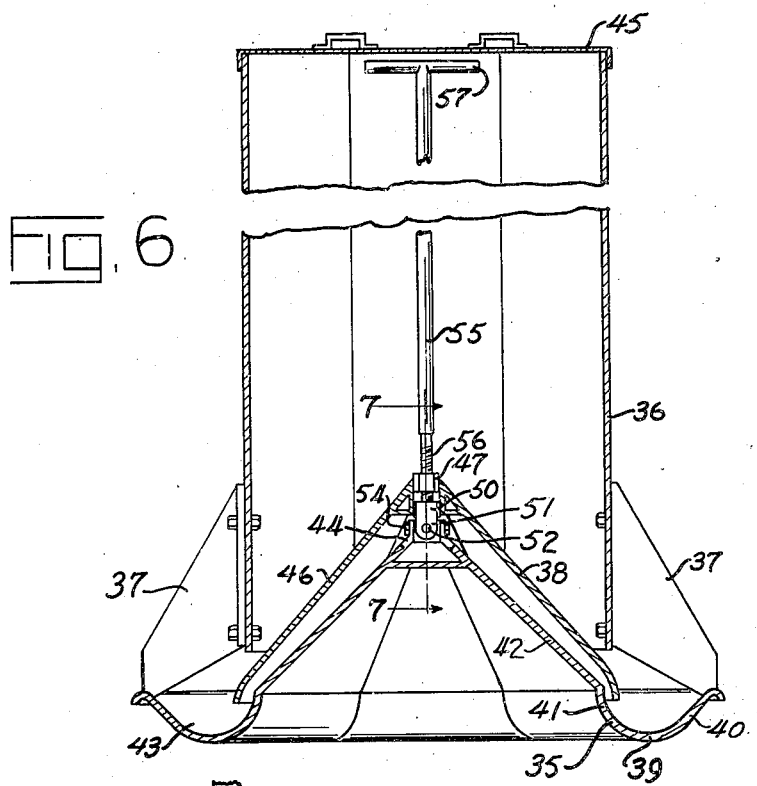
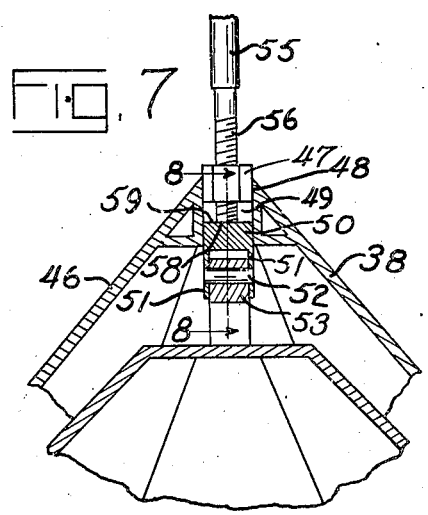
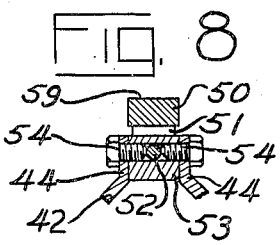
INVENTOR.
STANLEY E. KEAGLE
BY
G. H. Braddock
ATTORNEY Patented Oct. 25, 1949

2,485,832

UNITED STATES PATENT OFFICE 2,485,832

FEEDER

Stanley E. Keagle, Minneapolis, Minn.

Application January 17, 1946, Serial No. 641,752

2 Claims. (Cl. 119—53.5)

This invention has relation to a feeder for animals designed to be more especially useful to the purpose of receiving materials, such as grain or other granular substances, for feeding to hogs and of depositing the received materials to locations where they will be readily accessible to the hogs. However, the feeder advantageously can be employed to the purpose of feeding animals other than hogs.

An object of the invention is to provide a feeder for receiving materials and depositing the received materials where they will be accessible to animals which will be of simple, inexpensive, new and improved construction.

A further object is to provide a feeder for animals wherein will be incorporated various improved and advantageous features and characteristics of construction which will be novel both as individual entities of the feeder and in combination with each other.

And a further object is to provide a feeder for animals which will include features and characteristics of construction as herein illustrated and described.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Fig. 2 is a top plan view of the feeder of Fig. 1 with the cover for the feeder removed;

Fig. 3 is a fragmentary side elevational view disclosing the lower portion of the feeder of Figs. 1 and 2;

Fig. 5 is a detail sectional view, taken on line 5—5 in Fig. 4;

Fig. 6 is a central, vertical sectional view of a feeder for animals of modified construction including features of the invention;

Fig. 7 is a detail sectional view, taken as on line 7—7 in Fig. 6; and

Fig. 8 is a detail sectional view, taken as on line 8—8 in Fig. 7.

Figure 1:
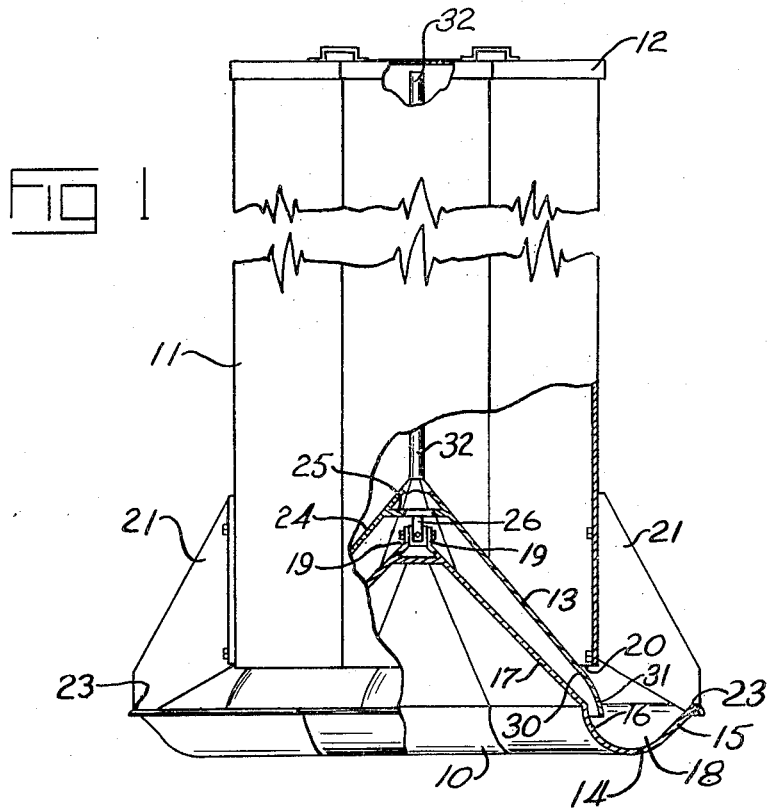
Fig. 1 is a side elevational view, partially in section and partially broken away, of a feeder for animals made according to the invention.
Figure 4:
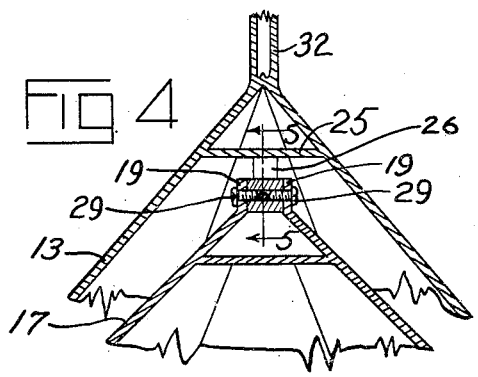
Fig. 4 is a central, vertical sectional view detailing feaures of the invention.

Speaking generally, and referring to Figs. 1 to 5 of the drawings, the animal feeder of the invention consists of a horizontally disposed lower base member 10, a vertical hollow body member 11 supported upon said lower base member 10 in spaced relation to the lower base member and having a removable cover 12, and a horizontally disposed upper base member 13 universally supported upon said lower base member at location between and in spaced relation to the lower base member and said hollow body member.

The lower base member 10 is constituted as a one piece or unitary structure. As disclosed, each portion of said lower base member is integral with every other portion of the lower base member. Desirably, the lower base member 10 may be composed of metal, or said lower base member may consist of other material suitable to its purpose.

More explicitly, the lower base member 10 includes an annular lower wall 14, curvilinear in horizintal direction, adapted to rest upon a horizontal surface, an annular outer wall 15 extending upwardly and outwardly from and integral or rigid with said lower wall 14, an annular inner wall 16 extending upwardly and inwardly from and integral or rigid with the lower wall 14, and a substantially conical upper wall 17 integral or rigid with the upper portion of the annular inner wall 16 about the full circumference of said inner wall and situated above and in concentric relation to said annular lower wall 14. The lower wall 14, the outer wall 15 and the inner wall 16 together provide an annular trough of the lower base member 10 in surrounding relation to and below the substantially conical wall 17, and the upper portion of said substantially conical wall 17 terminates at elevation above the elevation of the outer and inner walls 15 and 16.

The upper portion of the substantially conical upper wall 17 integrally or rigidly supports spaced apart, parallel, upwardly extending straps, denoted 19, 19, which are in effect upward continuations of said substantially conical wall 17.

The hollow body member 11, adapted to receive materials to be fed to animals and to constitute a container or reservoir for the materials, is cylindrical as shown and includes an upper, open end adapted to be closed by the removable cover 12. The lower end of said hollow body member, container or reservoir 11 also is open, as indicated at 20, and the hollow body member, container or reservoir is situated substantially above and in spaced, concentric relation to the substantially conical upper wall 17 of the lower base member 10. Said hollow body member, container or reservoir 11 as disclosed is of diameter slightly greater than that of the conical upper wall 17 of the lower base member 10 at its lower end, or location of merger with the upper marginal portion of the annular inner wall 16 of said lower base member.

The hollow body member, container or reservoir 11, which may be composed of any material, such as metal, suitable to its purpose, is rigidly supported upon the lower base member 10 by brackets, each denoted 21. As disclosed, there are four brackets 21 spaced at ninety degrees apart. Each bracket consists of a flat piece or strip of material, such as metal, having its upper, inner portion adjustably secured, as at 22, up against the external cylindrical wall of said hollow body member, container or reservoir and its lower, outer portion squarely seated, as at 23, upon an annular upper surface of the annular outer wall 15 of the lower base member 10. The construction and arrangement are such that the hollow body member 11 can be adjusted vertically relative to the lower base member 10. As shown, the brackets 21 extend radially outwardly from the hollow body member 11. The lower extremities of said brackets may be welded, or otherwise secured, to the lower base member in any instance when considered preferable.

The upper base member 13, universally supported upon the lower base member 10 between and in spaced relation to said lower base member and the hollow body member, container or reservoir 11, also is constituted as a one piece or unitary structure. That is to say, each portion of the upper base member is integral with every other portion of said upper base member in the disclosure as made. The upper base member 13 may be composed of metal, or said upper base member may consist of other material suitable to its purpose.

More explicitly, the upper base member 13 includes or is constituted as a substantially conical wall 24 the upper portion of which integrally or rigidly supports a transversely extending cross piece 25 situated interiorly of said substantially conical wall 24 and arranged substantially at right angular relation to the longitudinal axis of the hollow body member, container or reservoir 11.

The transversely extending cross piece 25, supported by the substantially conical wall 24 of said upper base member 13, integrally or rigidly supports spaced apart, parallel, downwardly extending straps denoted 26, 26, which are disposed at right angular relation to the spaced apart, parallel, upwardly extending straps 19, 19 upon the upper portion of the substantially conical upper wall 17 of the lower base member 10.

A cross pin 27, rotatably mounted in and extending between the spaced apart, parallel, downwardly extending straps 26, 26 upon said transversely extending cross piece 25 passes through an opening in a rectilinear block 28 situated between said downwardly extending straps 26, 26. As shown, the block 28 is of dimension substantially to fill the space between the spaced apart straps 26, 26.

Each of the spaced apart, parallel, upwardly extending straps 19, 19 supports a cross pin, denoted 29, 29, which extends inwardly, and said cross pins 29, 29 are in alined relation to each other and in the plane of and in perpendicular relation to the cross pin 27. More explicitly, the exterior end portions of the cross pins 29, 29 are fixedly supported in the straps 19, 19 and the interior end portions of said cross pins 29, 29 are rotatably mounted in the block 28. Said block 28 also is of a dimension substantially to fill the space between said straps 19, 19.

Obviously, the straps 19, 19, 26, 26, the cross pins 27, 29, 29 and the block 28 together constitute an instrumentality which universally supports the upper base member 13 upon the lower base member 10.

The construction and arrangement are such that when said upper base member 13 is universally supported upon said lower base member 10, the apices of the substantially conical wall 24 of the upper base member and the substantially conical wall 17 of the lower base member are situated in vertical alinement and spaced relation. The construction and arrangement also are such that when said upper and lower base members 13 and 10 are assembled together in the manner as set forth, the substantially conical wall 24 is in spaced, overlying, substantially concentric relation to the substantially conical wall 17, as well as in spaced, substantially concentric relation to the hollow body member 11. The apices of the substantially conical walls 17 and 24 are situated within said hollow body member 11 in spaced relation to its lower, open end, and the outer annular portion 30 of said substantially conical wall 24 is situated between and in spaced relation to said lower, open end of the hollow body member 11 and the lower end portion of the substantially conical wall 17. The lower, outer marginal portion 31 of said substantially conical wall 24 curves smoothly inwardly and is situated in slightly spaced, surrounding, substantially concentric relation to the upper portion of the annular inner wall 16 of the lower base member 10.

Evidently, the substantially conical wall 24 of the upper base member 13 is mounted upon the lower base member 10 and situated relative to its substantially conical wall 17 for free rocking or tilting movement about horizontal axes in any direction relative to said substantially conical wall 17. That is to say, the universal connection between the lower and upper base members causes the substantially conical wall 24 of said upper base member to be mounted upon, substantially above and in spaced, surrounding relation to the substantially conical wall 17 of said lower base member in such manner that said substantially conical wall 24 is floatingly supported to be capable of having rocking or tilting movement in any vertical plane relative to said substantially conical wall 17.

A vertical handle or rod for manually accomplishing rocking or tilting movement of the upper base member 13 is indicated 32. As disclosed, the handle or rod 32 extends along the longitudinal axis of said upper base member, at the transverse center of the feeder, and projects upward from the apex of the substantially conical wall 24 and terminates at location just beneath the removable cover 12. The handle or rod 32 is integral or rigid with the substantially conical wall 24.

With respect to Figs. 6 to 8 of the drawings, numeral 35 denotes a horizontally disposed lower base member, equivalent to the lower base member 10, 36 represents a vertical hollow body member, equivalent to the vertical hollow body member 11, suitably supported upon said lower base member 35 by brackets 37, equivalent to the brackets 21, and 38 indicates a horizontally disposed upper base member, equivalent to the upper base member 13, universally supported upon said lower base member 35 and located between and in spaced relation to the lower base member 35 and said hollow body member 36.

The lower base member 35 is as disclosed of substantially the same structure as is the lower base member 10, and includes an annular lower wall 39, curvilinear in horizontal direction, adapted to rest upon a horizontal surface, an annular outer wall 40 extending upwardly and outwardly from and integral or rigid with said lower wall 39, an annular inner wall 41 extending upwardly and inwardly from and integral or rigid with the lower wall 39, and a substantially conical upper wall 42 integral or rigid with the upper portion of the annular inner wall 41 about the full circumference of said inner wall and situated above and in concentric relation to said annular lower wall 39. The walls 39, 40 and 41 together provide an annular trough 43, equivalent to the annular trough 18, in surrounding relation to and below the substantially conical wall 42, and the upper portion of said substantially conical wall 42 terminates at an elevation above the elevation of the annular outer and inner walls 40 and 41.

The upper portion of the substantially conical upper wall 42 integrally or rigidly supports spaced apart, parallel, upwardly extending straps 44, 44, equivalent to the straps 19, 19, which are in effect upward continuations of said substantially conical wall 42.

The hollow body member 36 is as shown a duplicate of the hollow body member 11, and includes a removable cover 45, similar to the removable cover 12. The lower end of said hollow body member 36 is open, and the hollow body member 36 is situated substantially above and in spaced, concentric relation to the substantially conical wall 42 of the lower base member 35. Said hollow body member 36 bears the same relation to the lower base member 35 as does the hollow body member 11 to the lower base member 10.

The upper base member 38 includes or is constituted as a substantially conical wall 46, equivalent to the substantially conical wall 24, the upper portion of which integrally or rigidly includes or supports an internally threaded member 47. As disclosed, the internally threaded member 47 is constituted as a nut welded, as at 48, to the apex of the upper base member and including an internal thread which extends along the vertical axis of said upper base member 38.

A vertical rectilinear passageway of the upper base member 38, beneath the internally threaded member or nut 47, is denoted 49, and a rectilinear support snugly and slidably fitted to said rectilinear passageway 49 is designated 50.

The rectilinear support 50 integrally or rigidly carries spaced apart, parallel, downwardly extending straps, denoted 51, 51, which are disposed at right angular relation to the spaced apart, parallel, upwardly extending straps 44, 44 upon the upper portion of the substantially conical wall 42 of the lower base member 35.

A cross pin 52, rotatably mounted in and extending between the spaced apart, parallel, downwardly extending straps 51, 51 upon said rectilinear support 50, passes through an opening in a rectilinear block 53 situated between said downwardly extending straps 51, 51. The rectilinear block 53 is of dimension substantially to fill the space between the spaced apart straps 51, 51.

Each of the spaced apart, parallel, upwardly extending straps 44, 44 supports a cross pin, denoted 54, 54, which extends inwardly, and said cross pins 54, 54 are in alined relation to each other and in the plane of and perpendicular to the cross pin 52. The exterior end portions of the cross pins 54, 54 are fixedly supported in the straps 44, 44 and the interior end portions of said cross pins 54, 54 are rotatably mounted in the rectilinear block 53. Said rectilinear block 53 also is of dimension substantially to fill the space between said straps 44, 44. The straps 44, 44, 51, 51, the cross pins 52, 54, 54 and the rectilinear block 53 together constitute an instrumentality for universally supporting the upper base member 38 upon the lower base member 35.

A vertical handle or rod, for adjusting the upper base member 38 vertically and for adjustably supporting said upper base member upon the lower base member 35 and for manually accomplishing rocking or tilting movement of said upper base member 38, is indicated 55. The lower end portion of said vertical handle or rod 55 includes an external thread 56 which is received in the internal thread of the member or nut 47, and a cross piece 57 upon the upper end of the handle or rod 55 is for accomplishing turning movement of said handle or rod. The handle or rod 55 extends along the longitudinal axis of the upper base member 38, at the transverse center of the feeder, and projects upwardly and terminates just beneath the removable cover 45. The construction and arrangement will be such that the lower end 58 of said vertical handle or rod 55 will be situated below the internally threaded member or nut 47 to be engaged against the upper surface 59 of the rectilinear support 50 thus to cause the upper base member 38 to be supported upon said rectilinear support 50. Obviously, said upper base member 38 can be adjusted vertically with respect to the lower base member 35 by rotational adjustment of the vertical handle or rod 55 in the internally threaded member or nut 47. More explicitly, with rotational adjustment of the handle or rod 55 which causes said handle or rod to be turned downwardly in the member or nut 47 there will be upward adjustment of the upper base member 38 away from the lower base member 35, and with rotational adjustment of the handle or rod 55 which causes said handle or rod to be turned upwardly in said member or nut 47 there will be downward adjustment by gravity of said upper base member 38 toward said lower base member 35. Clearly, the rectilinear support 50 constantly will be situated within the rectilinear passageway 49 at distance from the internally threaded member or nut 47 dependent upon the adjusted position of the vertical handle or rod 55.

When the upper base member 38 is universally supported upon the lower base member 35, the apices of the substantially conical walls 46 and 42 of the upper and lower base members are situated in vertical alinement and spaced relation. Also, when said upper and lower base members 38 and 35 are assembled together, the conical wall 46 is in spaced, overlying, substantially concentric relation to the conical wall 42, as well as in spaced, substantially concentric relation to the hollow body member 36. The apices of the substantially conical walls 42 and 46 are situated within said hollow body member 36 in spaced relation to its lower, open end, and an outer annular portion, equivalent to the outer annular portion 30, of the substantially conical wall 46 is situated between and in spaced relation to said lower, open end of the hollow body member 36 and the lower end portion of the substantially conical wall 42. The lower, outer marginal portion of said substantially conical wall 46 curves smoothly inwardly and is situated in slightly spaced, surrounding, substantially concentric relation to the upper portion of the annular inner wall 41 of the lower base member 35.

The substantially conical wall 46 of the upper base member 38 is mounted upon the lower base member 35 and situated relative to its substantially conical wall 42 for both vertical adjustment and free rocking or tilting movement about horizontal axes in any direction relative to said substantially conical wall 42.

Materials to be fed to animals, such as hogs, can be deposited in the hollow body member, container or reservoir of the feeder while the cover is removed, and after the feed materials have been deposited, the cover can be replaced. Evidently, all of the deposited feed materials eventually will reach the portion of the annular trough situated between the lower, outer marginal portion of the substantially conical wall of the upper base member and the annular outer wall of the lower base member. The animals or hogs while eating will, naturally, come into contact with said lower, outer marginal portion of the substantially conical wall of said upper base member thus to cause said mentioned substantially conical wall to be rocked or tilted relative to the substantially conical wall of the lower base member, and relative rocking or tilting movement, in various directions from time to time, of said substantially conical walls will preclude possibility of stopping or clogging of the flow of feed materials from the hollow body member, container or reservoir. In any instance where the upper base member may become unbalanced toward the side of the hollow body member, container or reservoir, as might possibly occur when loading of said hollow body member, container or reservoir is being accomplished, the vertical handle or rod can be grasped and manually manipulated to right the balanced condition of said upper base member. When feed materials are deposited in the hollow body member of the feeder, the annular trough evidently will receive portions of the materials, and with removal of feed materials from said trough, more feed materials will enter from the hollow body member. Hogs, as well as other animals, will brush against the upper base member while feeding and cause the substantially conical wall of said upper base member to be rocked or tilted. Upon being released from rocked or tilted position, said substantially conical wall of the upper base member will return to its balanced floating position.

When the upper base member is in balanced floating position, the lower, outer marginal portion of its substantially conical wall will be in spaced, substantially concentric relation to the lower, open end of the hollow body member, beneath said lower, open end, and in spaced, surrounding, substantially concentric relation to the location of merger between the upper margin of the annular inner wall and the lower margin of the substantially conical wall of the lower base member, about as disclosed in Figs. 1 and 6 of the drawings.

The animal feeder as illustrated and hereinbefore described possesses various advantages over more or less similar devices heretofore known. Among these advantages may be mentioned the simplicity of construction of and the ease with which the animal feeder can be manufactured and assembled. The present animal feeder is adapted to be shipped in knocked down condition and assembled by a purchaser.

What is claimed is:

1. An animal feeder comprising a horizontal lower base member, a vertical hollow body member supported upon said lower base member above and in spaced relation thereto, a horizontal upper base member, spaced apart, upwardly extending first straps upon said lower base member, a support, spaced apart, downwardly extending second straps upon said support disposed at right angular relation to said first straps, a block situated between said first and second straps, first means mounted in said first straps and said block supporting the block for pivotal movement relative to the first straps, second means mounted in said second straps and said block supporting the second straps for pivotal movement relative to the block, an internally threaded member rigid with said upper base member disposed above said support in vertically alined relation therewith, the upper base member providing a passageway in which said support is slidably fitted, and a handle extending upwardly in said hollow body member including an externally threaded lower end portion engaged with said internally threaded member and a lower end rested against an upper surface of said support.

2. An animal feeder comprising a horizontal lower base member, a vertical hollow body member supported upon said lower base member above and in spaced relation thereto, a horizontal upper base member, spaced apart, upwardly extending first straps upon said lower base member, a support, spaced apart, downwardly extending second straps upon said support disposed at right angular relation to said first straps, a rectilinear block situated between said first and second straps, and engaged with said first and second straps, first means mounted in said first straps supporting said block for pivotal movement relative to the first straps, second means mounted in the block substantially at the elevation of said first means supporting the second straps for pivotal movement relative to said block, an internally threaded member rigid with said upper base member disposed above said support in vertically alined relation therewith, the upper base member providing a vertical passageway in which said support is snugly, slidably fitted, and a handle extending upwardly in said hollow body member including an externally threaded lower end portion engaged with said internally threaded member and a lower end rested against an upper surface of said support.

STANLEY E. KEAGLE.

REFERENCES CITED

The following references are of record in the file of this patent:

UNITED STATES PATENTS

| Number | Name | Date |
|---|---|---|
| 369,155 | Babcock | Aug. 30, 1887 |
| 555,909 | Smith | Mar. 3, 1896 |
| 1,292,693 | Brackenbury | Jan. 28, 1919 |
| 1,818,419 | Miller | Aug. 11, 1931 |
| 2,309,997 | Thieman | Feb. 2, 1943 |
| 2,335,337 | Hedrick | Nov. 30, 1943 |

FOREIGN PATENTS

| Number | Country | Date |
|---|---|---|
| 3,010 | Great Britain | Oct. 25, 1867 |
| 206,561 | Great Britain | Nov. 15, 1923 |
| 419,017 | Germany | Sept. 24, 1925 |
| 347,487 | Great Britain | Apr. 30, 1931 |
| 713,353 | France | Aug. 11, 1931 |